`US005953725A`

United States Patent [19]
Eprahim et al.

[11] Patent Number: 5,953,725
[45] Date of Patent: Sep. 14, 1999

[54] NETWORKED MULTIMEDIA INFORMATION SYSTEM

[75] Inventors: Peter Agha Eprahim; Doris Meschzan; Peter Sander, all of Mannheim, Germany

[73] Assignee: International Business Machines Incorporated, Armonk, N.Y.

[21] Appl. No.: 08/903,235

[22] Filed: Jul. 12, 1997

[30] Foreign Application Priority Data

Jul. 12, 1996 [DE] Germany .......................... 196 28 168

[51] Int. Cl.[6] ........................................................ G06F 17/30
[52] U.S. Cl. .......................... 707/103; 707/100; 707/104; 364/146
[58] Field of Search ............................... 707/8, 203, 100, 707/2, 3, 103, 104; 364/146

[56] References Cited

U.S. PATENT DOCUMENTS

| | | | |
|---|---|---|---|
| 5,491,820 | 2/1996 | Belove et al. | 707/3 |
| 5,508,733 | 4/1996 | Kassatly | 348/13 |
| 5,555,244 | 9/1996 | Gupta et al. | 370/397 |
| 5,652,714 | 7/1997 | Peterson et al. | 702/57 |
| 5,768,578 | 6/1998 | Kirk et al. | 707/100 |
| 5,812,394 | 9/1998 | Lewis et al. | 364/146 |

*Primary Examiner*—Wayne Amsbury
*Assistant Examiner*—Shahid Alam
*Attorney, Agent, or Firm*—Ronald L. Drumheller

[57] ABSTRACT

The invention concerns multimedia kiosk (newsstand) systems where single system units are interconnected via a telecommunication network. The objective is to enable updating of all information and/or the network interconnection structure between the system units during run-time.

The invention solves this problem, by common dynamic management of both the configuration data and the information contents in an object-oriented database. The provision of all system functionalities as an object-oriented database enables the kiosk contents in an individual kiosk to be updated, or configuration data, e.g. network addresses to be notified-during run-time. For updating it is only necessary to transfer a so-called "version file" at a particular point in time to one or more terminals via the network. The database operations indicated in the version file are then executed at the terminal in the background, step by step. The step by step procedure for updating the information contents of a kiosk system unit guarantees—in contrast to a total replacement of the information—shorter updating times and a lower network load, since a much smaller amount of data has to be sent.

It should be emphasized that the updating of a system take place ONLINE, i.e. the kiosk application does not have to be shut down.

7 Claims, 5 Drawing Sheets

NETWORKED MULTIMEDIA INFORMATION SYSTEM

BACKGROUND OF THE INVENTION

1. Field of the Invention

The invention relates to networked multimedia information systems, in which individual system units communicate with one another. In particular, the invention relates to kiosk newsstands.

2. Related Art

Known information systems of the above-mentioned type generally provide individual publicly accessible computer-based systems (kiosks) in which even users who are not trained in kiosk operation can rapidly call up information and conduct transactions. The data in this case can be present as discrete media (such as text and graphics) and as continuous media (such as audio and video).

Such systems also serve for the development of individual kiosks, where the kiosks are programmed with known development solutions, usually in a high-level programming language and where the corresponding programs are then only interpreted at run time. The production of the necessary programs is carried out either using context-sensitive editors (J. L. Encarnacao et al., "Autorenwerkzeuge fir multimediale Informationssysteme", in it+ti Informationstechnik und Technische Informatik, No. 2, pp. 31–38, Oldenbourg-Verlag, Munich, April 1993) or using known graphical development tools.

With the aid of such tools, a trained kiosk developer is generally adequately supported. However, even the maintenance and up-dating of the kiosks require reversion to these tools. The kiosk operator must therefore rely on the technical kiosk developer for maintenance and up-dating. In addition, the amendment of such programs is tedious and error-prone. The maintenance and up dating of kiosks with rapidly changing contents is thus awkward and expensive.

According to an article by Gerold Blakowski, Ralf Steinmetz and Daniel Köhler at the IBM European Networking Center, Heidelberg, entitled "Architecture and Implementation of a Distributed Multimedia—Kiosk System" and which appeared in it+ti-Informationstechnik und Technische Informatik, No. 37, p. 35ff., Oldenbourg Verlag, Munich, April 1995, central elements of multimedia kiosk systems are:

- an object-oriented generic kiosk structure, which specifies both the processes within a kiosk as well as the media units incorporated. The structure and pertinent content data of the kiosk are stored in a persistent distributed database.
- an object-oriented run time system, which coordinates the process of a kiosk according to the kiosk structure and is particularly distinguished by short response times. The run-time system can be expanded by means of modules which can be uploaded during run-time, which carry out both the integration of instruments and communication services, as well as completing or overstocking internal functionalities.
- dedicated graphics editors, which support the kiosk developer in the production of the system and the kiosk manager in the care and maintenance. In particular, the manager can independently update the kiosk.

It is emphasized, that the above mentioned publication—in contrast to the existing invention—refers solely to a single place system (stand-alone).

In the design of a kiosk development and run-time system the following roles must be distinguished: The kiosk developer, who prepares the design, the media contents and the kiosk run-time structure; the kiosk manager, who makes the kiosk available; and the kiosk users. The kiosk developer determines first the design of the kiosk. The next kiosk developing step comprises establishing the media units used in the kiosk, that is to say, the media recording and the succeeding processing steps, such as digitizing, format converting and compression of individual media.

For the kiosk manager, a user-friendly care of the kiosk contents and the corresponding kiosk structure (see below) is essential. In order to update the kiosk he must be capable of making changes to the content himself, without having to consult experts in kiosk development. Frequently required changes involve changed texts, new pictures or incorporating and masking individual run paths within the kiosk. Generally there are also on-going updates needed with the inclusion, removal and displacement of individual kiosk pages. In networked systems it is also generally necessary, to send the updated contents automatically to all running kiosks, if the same kiosk type is installed at different places. With all changes the existing basic design of the kiosk should always be retained, that is to say, all changes should be executed only as part of previously determined design rules.

For the structuring of kiosk systems it has recently been proposed to establish an object-oriented record with attributed relationships between objects, as a result of which an abstract description of a kiosk structure inclusive of the possible run-time relationships becomes possible.

To develop an individual kiosk then only means the updating of the concrete kiosk objects and the determination of the relationships between the objects. The objects and their relationships are posted to an object-oriented database. One advantage is that, in the development of a new kiosk, the run-time system does not have to be changed, but it is sufficient to fill the kiosk database with other objects and to define the relationships between the objects.

A large part of the known kiosk systems are so-called "Stand-Alone" systems, in which the kiosks are not networked together. This implies that their information content is changed only rarely or even never, for a change requires a manual action by a system server, e.g. a specially trained engineer.

Networked kiosks are presently only implemented individually and are essentially realized on the basis of a central "Updateserver". Using a central server, new contents, such as new products or real estate offers can be distributed to all or a selected number of systems.

The design of a networked information system with the above described functionalities is, however, only possible with massive limitations using state of the art central server concepts.

Only in specific cases are the above mentioned problems solved by the current state of the art. For example, in the area of administration and control, a distributed computer network in which a group of data stations are joined together through a local network (LAN), is disclosed in U.S. patent application Ser. No. 771 063 (AZ K1991054). In such systems, it is necessary to monitor the current condition of the network through a control device and to update the contents of distributed databases regularly. To improve data security in the network a network structure with redundancy is proposed, in which several control devices are provided, where at any given point in time only one device is active.

Furthermore in European Patent Application No. 5 019 963 (AZ UK987003) a computer network is described in which a plurality of data stations, e.g. personal computers (PC), is connected to a main computer. One data station, which wishes to take over leading a task, transmits information in reference to the relevant data records and the respective version number to the main computer. The main computer then ascertains whether the newest version of the data record exists on the PC concerned.

The problem of data integrity in the area of distributed data-base systems is the subject of a publication in the IBM Technical Disclosure Bulletin, Vol. 18, No. 8, January 1976 (AZ UK8740138). This Application particularly affects the updating of data records in a distributed system. A particular updating method is proposed, in which the main computer checks the data stations for the relevant latest version and, if necessary, deletes older versions.

In the World Patent Index, Research Disclosure, Ord.No. R08860098, a process for the updating and/or for the exchange of computer programs in a running computer system is disclosed, in which the computer system does not have to be switched off and/or shut down during the exchange. For this, a novel program-connecting mechanism is proposed, in which the calling and corresponding called program modules are not directly connected together ("linked"), but a corresponding control program along with a corresponding connecting table is inserted between them.

SUMMARY OF THE INVENTION

It is thus the task of the existing invention to provide a networked multimedia information system, which makes, it possible to update all information about the information contents and/or the network structure between the system units at run-time under the above-mentioned conditions.

The problems addressed above are solved in particular through a common dynamic administration of configuration data and information content in an object-oriented database. The consistent development of all system functionalities on the basis of an object-oriented database (FIG. 1) makes it possible to update kiosk contents or to modify configuration data, such as kiosk type or network address in an individual kiosk during the run-time.

Each change of the kiosk content or the system configuration can be described as a final consequence of a database call. If, for example, the current presentation is modified at a so-called "editing place" through the inserting of a new contents page, then all database commands triggered by this action are stored in a so-called "version file".

This version file is sent to one or more terminals over the network at a point in time determined by a so called "administrator". The database operations recorded in the version packet are then interpreted at the terminal in the background, step by step. These 'virtual editing sessions' guarantee a reliable comparison of the version between customer and editing system, without having to shut down the kiosk application.

The incremental updating of the kiosk content—in contrast to a complete data exchange—guarantees not only shorter updating times but also a lower network load, since many fewer data have to be sent.

The amendment of configuration data also proceeds in the same way. Since these, just like the information contents, exist only as database objects, run-time amendment poses no problem and can be initiated and carried out at any time by the administration location.

Even the user role (kiosk user) of the individual kiosk system in the total network exists only as a configuration object of the information contents. The individual kiosk is polymorphic, i.e. each kiosk has the functionality of all potential user roles. A change of role during run-time is unproblematic and can be undertaken by the current administrator.

Furthermore the updating of the-kiosk contents can be controlled and automated particularly advantageously by means of a timer. These timers are also stored as configuration objects in the object-oriented database for the dynamic administration of configuration data and information contents (kiosk contents), in accordance with the above-mentioned principles of the invention.

The corresponding timer objects (Net Node Timer) have attributes which determine the point in time and, if necessary, the repetition rate (e.g. daily, weekly, etc.) and the type (contents or configuration updating, statistics) of the timer. For statistical use, numbers of individual kiosk pages, with which a statistical inquiry can be produced, for example, come into consideration. As configuration objects of the database the timer can of course be produced, modified, or deleted at any time by the administrator. The administrator can allocate any arbitrary number of timers to each individual system managed by him. If one or more timers are associated in this way with a kiosk, the run-time system of this kiosk starts so-called "system timers", which agree in their run time with the value determined in the attributes.

The running of a timer causes the system, depending on the type of timer object, to carry out a particular action. This can be a request for a new version of the contents and/or configuration from the responsible updateserver as well as the transmission of locally collected statistics data to the responsible administration location.

An important feature of all actions initiated by timers is that they are executed in the background and do not hinder a possibly simultaneously occurring interaction of a user with the individual system.

The information system in accordance with the invention is described in detail in the following part using a preferred example of a kiosk. The scope of the invention is not limited to kiosk systems, however, but includes all information systems with networked system units. In particular, the general inventive concepts with regard to the dynamic information contents of system information are also applicable in other multimedia systems, e.g. multimedia computers in a LAN (Local Area Network), or in multimedia stations connected to the Internet.

In detail:

DESCRIPTION OF THE PREFERRED EMBODIMENTS

Figure 1:
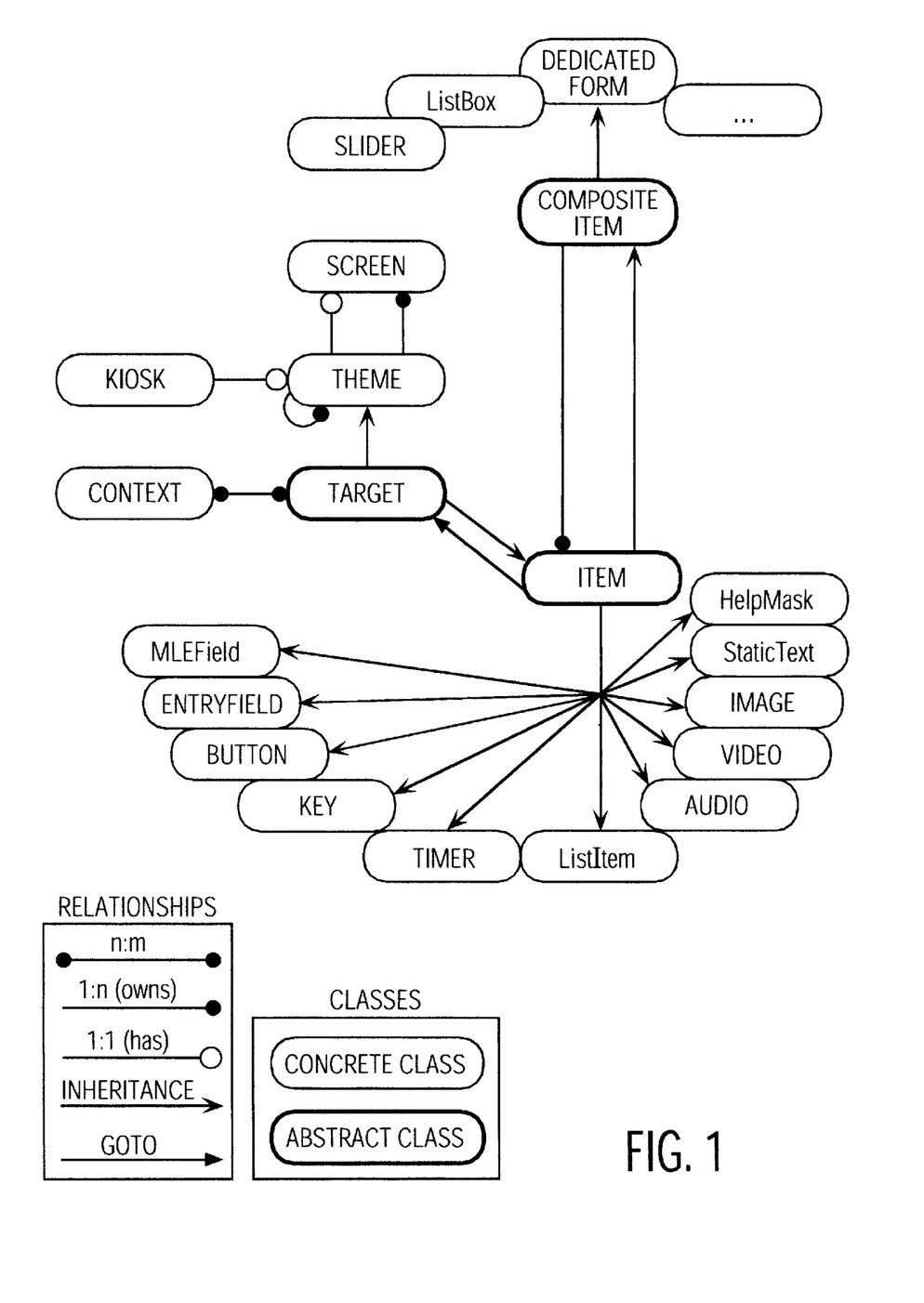
FIG. 1 shows a representation of the classes and relationships in the object-oriented record for a kiosk in accordance with the state of the art.

The elements of the object-oriented record for a kiosk are shown in FIG. 1. The classes "Item", "CompositeItem" and "Target" are realized as abstract main classes. Abstract classes display no concrete objects, they bequeath only their attributes and methods to inheriting classes, which for their part display objects. As an illustrative example, a main class is called "vehicle", its subordinate classes can be, for example, "passenger vehicles" or "commercial vehicles" which both inherit attributes like "doors" or "wheels" from the main class. They summarise common characteristics of other classes, to take optimal advantage in creation as well as later at the run-time of the system of the advantages of both reusability and-expandability. In the instantiation of a concrete kiosk with its contents, however, objects of these abstract classes never exist; for instance, a "button" represents an item with specific attributes.

The most important object classes and interrelationships of the objects are explained in more detail in the following:

Starting with the class "kiosk" one arrives through a 1:1 relationship at a specific theme, the so-called initial theme of the corresponding multimedia presentation. In an object of the class kiosk only a few global data are held, such as the "Time-out" for a kiosk "Trailer", for example. In a kiosk there is generally only one object of the class kiosk and this serves as a defined starting point of the kiosk for the kiosk run-time system.

A "theme" represents a user-selectable information area. A theme can again own sub-themes, comparable with chapters in a book. A theme itself still does not represent any information, but for this purpose owns one or more pages.

A "page" (Screen) describes the background, on which other elements are presented. A page is comparable with the medium paper of a book. It has, for example, a particular size, colour and structure. A page can be equated with several pages anchored in a theme, where there is always exactly one starting page (1:1 relationship). If the user chooses a certain theme, the run-time system recognizes which page must be displayed first. Naturally with page-oriented navigation it is also possible to change directly from one page to any other desired page of another theme. The summary of pages to a theme was introduced primarily to clarify the structure of the kiosk for the kiosk developer and kiosk manager. When a theme is deleted, all affected pages are deleted.

Presentation objects, hereinafter referred to as "Items", are objects of classes, which are derived from the abstract class Item and represent the information contents. Each class derived from-the class "Item" describes a certain kind of information, for example, text, graphic, audio or video, which can be combined arbitrarily with each other. They are comparable with the letter and graphics on a page in a book. There are interactive and passive items: interactive items, like buttons and entry fields, handle user entries. With them the user can trigger actions which influence the course of a presentation. In addition, there are also passive items which are only displayed, for example, an individual graphic. In the typical case, a page will contain both passive and interactive items, as well as graphic buttons and other elements, by means of which the user can interact with the system. Items can be connected by means of the "GO TO" relationship with other items or also with themes or pages and thus effect selection of a theme, the changing of a page or a change of state of another item. The GOTO relationship is the central run-time relationship in the abstract kiosk.

The "CompositeItem" serves to summarise Items to a new object. In this way a CompositeItem can service the basic functionality of the contained Items and add these to a new, superior functionality, wherein the CompositeItem has control over the whole composite object. CompositeItems can be hierarchically ordered.

Figure 2:
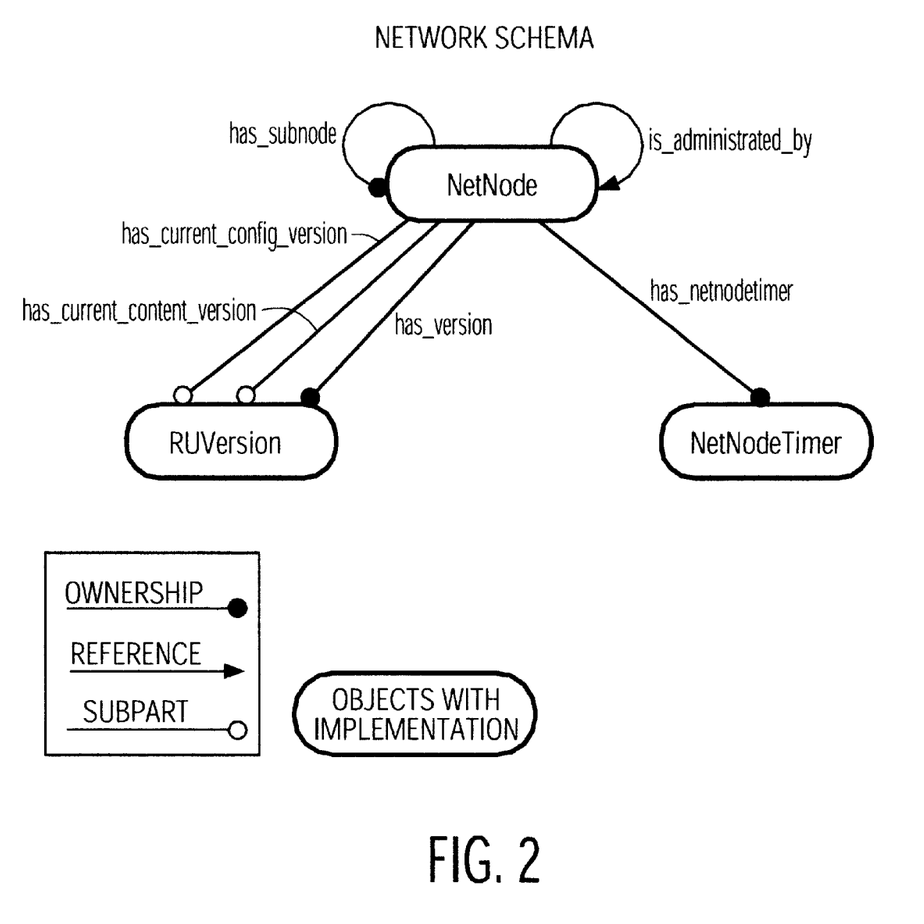
FIG. 2 as a complement to FIG. 1 shows a display of the kiosk contents diagram.

Complementary to FIG. 1, FIG. 2 shows a schematic representation of the network structure of the networked system, wherein the class formation corresponds with FIG. 1. From this illustration it is clear, in particular, how the configuration objects of the multimedia system are formed as classes of an object-oriented database. Configuration objects include, for example, attributes of the network nodes such as node designation, physical address of the node, logical node address, or role of the node within the hierarchy. The so-called "Ownership Reference" may never be deleted, unless all relationships between the network nodes are already deleted. The upper left circle shows the so-called "Domain relationship", i.e. the hierarchical relationship of the nodes to one another (Network architecture).

Accordingly three object classes can be distinguished:
1. Multimedia single system (NetNode);
2. Timer (NetNodeTimer); and
3. Database version (RUVersion="Remote Update Version").

Figure 3:
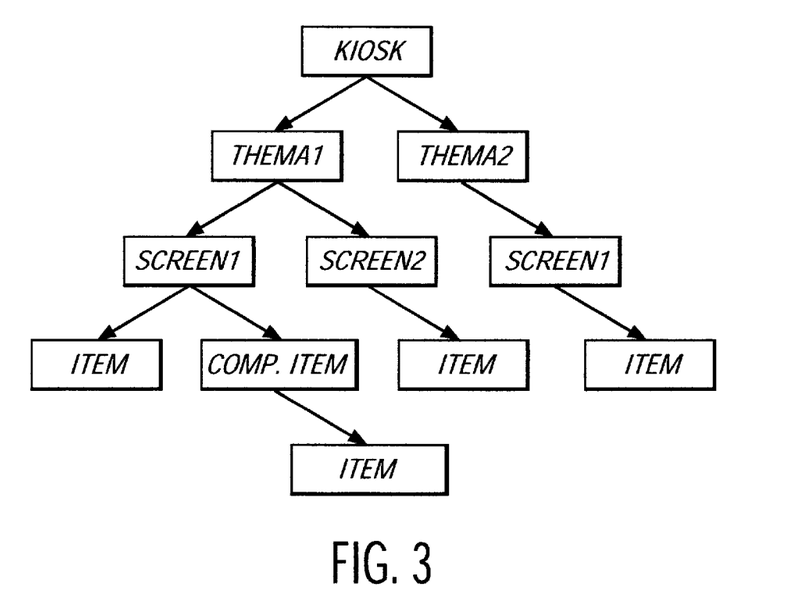
FIG. 3 the display of an example of a property hierarchy in the object-oriented record in accordance with FIG. 1.

FIG. 3 shows an example of a class hierarchy and its functionality between objects of a kiosk content. In particular, this lists interactions between different Items.

Figure 4:
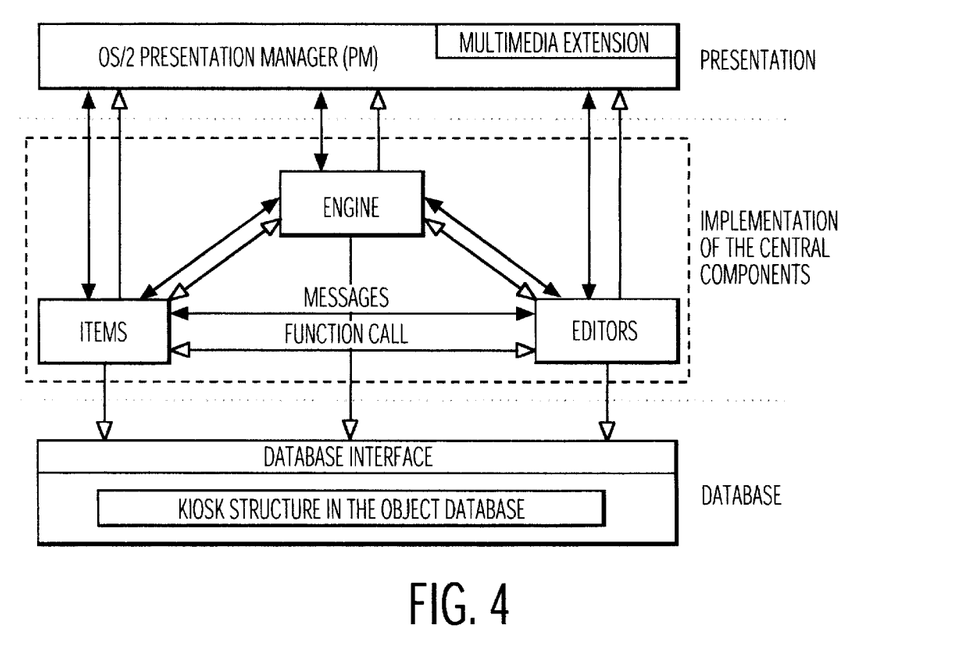
FIG. 4 a survey of the architecture of a run-time system in accordance with the state of the art.

FIG. 4 shows a survey of the architecture of the run-time system. This can be divided into three functional layers. The interaction between the modules is indicated by arrows. In this example the "Manager" (PM) by IBM OS/2, expanded by the "Multimedia-Presentation-Manager" (MMPM/2) serve as graphics interfaces ("IBM", "OS/2" "and MMPM/2" are Registered Trademarks of the IBM Corporation).

This makes possible simple and above all standardised programming of the multimedia equipment installed in the system, such as, for example, sound cards or video player hardware, as a result of which the kiosk system is not equipment-dependent in this area. Thereby the relevant user role is reflected not only in the dynamic range of functionality provided, but the user interface also indicates the presently active role with characteristic colour and design.

The implementation of the objects/modules of the system forms the second layer in the system. Here are the control unit ("engine"), the presentation elements of the object-oriented (abstract) kiosk, as well as the different editor modules summarised for the different user roles. The editors are loaded, installed and/or activated according to the role of the user.

Through the addition or the removal of modules, even at run-time, the system can be individually configured, implemented and expanded. The direct access of the modules to interface and information content makes possible a productive realization, since each module can be adjusted optimally to the given interfaces and to the data format (media) to be serviced.

The lowest layer describes the information content. In this, the kiosk and the objects are stored. Through an external administration of the kiosk scheme it becomes possible, simply by exchanging the database, to completely refashion the system not only with regard to content but also by the run-time structure, without changing anything in the implementation of the remaining system. This simplifies the development of kiosks. The realization of the database requires additionally a common storage with suitable locking mechanisms for a kiosk system and persistent storage of the structure and data content. Alternative realizations are the application of a second generation database such as DB2/2 (Registered Trademark of the IBM Corporation), the employment of an object-oriented database, e.g. "Objectstore", use of files and network file systems and the realization of an independent database optimized for this case. To guarantee the desired fast response behaviour, a "Cache memory" based system was created after experimental checking with connection both to a relational database as well as to a file system.

The control over the system is effected by the aforementioned engine. This represents the main item of the run-time system and runs a kiosk. For this, it reads the structure information of the kiosk from the database and converts it to the corresponding news to the Items. The engine accesses the database and the functions of the graphics interface directly, for example, to generate the windows, in which the items appear. If, because of a user entry, an interactive item requires an action by the system, for example, transfer to another page of the kiosk, then this item initiates the implementation, in which it sends a corresponding order to the engine. The engine then determines from the database, which items of the kiosk are affected by an action and again sends these the corresponding news. Its display or other functions then executes the affected item itself. The engine is thus independent of the display of the contents.

A window is allocated to each item on the graphics interface. These windows own so called window procedures, through which an item receives all incoming news. This can be news from the interface itself, from the engine or from other arbitrary processes or modules in the system. Within the display area of the window, an item can produce graphical outputs, but also accept user entries.

To change the contents of the database so called "Editors" are used as processing means. An Editor directly accesses the data-base and can itself serve to display the contents of the remaining run-time system. According to the role of the user of the kiosk system, the Editor module makes different functionalities available. By realising the editor module separately, the corresponding module can be added for each user role or be individually adjusted.

The functionality of the editors can be adjusted even more precisely in each case, in that the Editing possibility is limited to individual kiosk objects, so that for example a real estate firm employee as kiosk manager can exchange with the Editor only pictures of real estate and the associated texts.

The database interface makes available abstract operations, like reading/setting of attributes, adding/deleting objects as well as setting/deleting/querying of relationships between objects (see FIGS. 1 and 3), e.g. the current version status of a network node (version object). It is advantageous that both the kiosk objects as well as the abstract kiosk can be addressed over the same interface. For this, the classes are considered as objects of so-called "Metaclasses". In this way, the database system's own intelligence is reduced to these metaclasses, that is to say, only the attributes and possible interrelationships of the metaclasses in the database system need to be known a priori.

The objects in the database either directly store their contents, for example, texts; or they reference content data, for example, audio/video files. Through the use of references to content data the storage requirements of the object database is greatly reduced and makes it possible to employ a local cache memory in the main storage for the storage of all kiosk objects and their relationships, which greatly increases the speed of access. References are resolved only at the run-time of the kiosk system.

The changing of characteristics of the user interface is supported by the object-oriented design. Through the omission or addition of new items or changing of their behaviour, the functionality can be changed in the user interface. In this example, this is effected through the implementation of the item properties in so-called "Item-DLLs" (Dynamic Link Libraries). With the loading of one Item-DLL the new functions contained therein become automatically available. A news interface produces the Item-DLL, whereby it receives—like the remainder of the system—access to the database and interface, and binds itself transparently into the system. On loading a DLL only its name, which is stored as an attribute in an Itemobject, needs to be known.

The complete scenario of a kiosk system can be broken down into four functionally different areas. Presentation, integration, manipulation and database (FIG. 5).

The presentation area presents the kernel of the previously presented run-time system of the kiosk. The integration area is composed of the Components that can be added at run-time, which integrate externally available services and instruments into the system. They are taken over into the presentation area at run-time of the system. The presentation and the integration components access the database exclusively for reading, in contrast to which the modules of the manipulation components have read and write access.

In the manipulation area, in addition to various role-specific editors, database-resources and programs for the manipulation and establishing of contents such as, for example, graphics and audio/video are summarised, which are used separately from the kiosk application. Through the application of standard formats to the contents, the kiosk developer is free to use whichever resources he wishes, as a result of which resources that may be available in the organization can be used more widely. The development of a kiosk is currently effected through a textual description of the objects occurring in the kiosk, from which the kiosk objects are produced by means of a converter. The existing run-time editors, that, is to say, particularly the kiosk manager's editor, work directly on the database.

Figure 5:
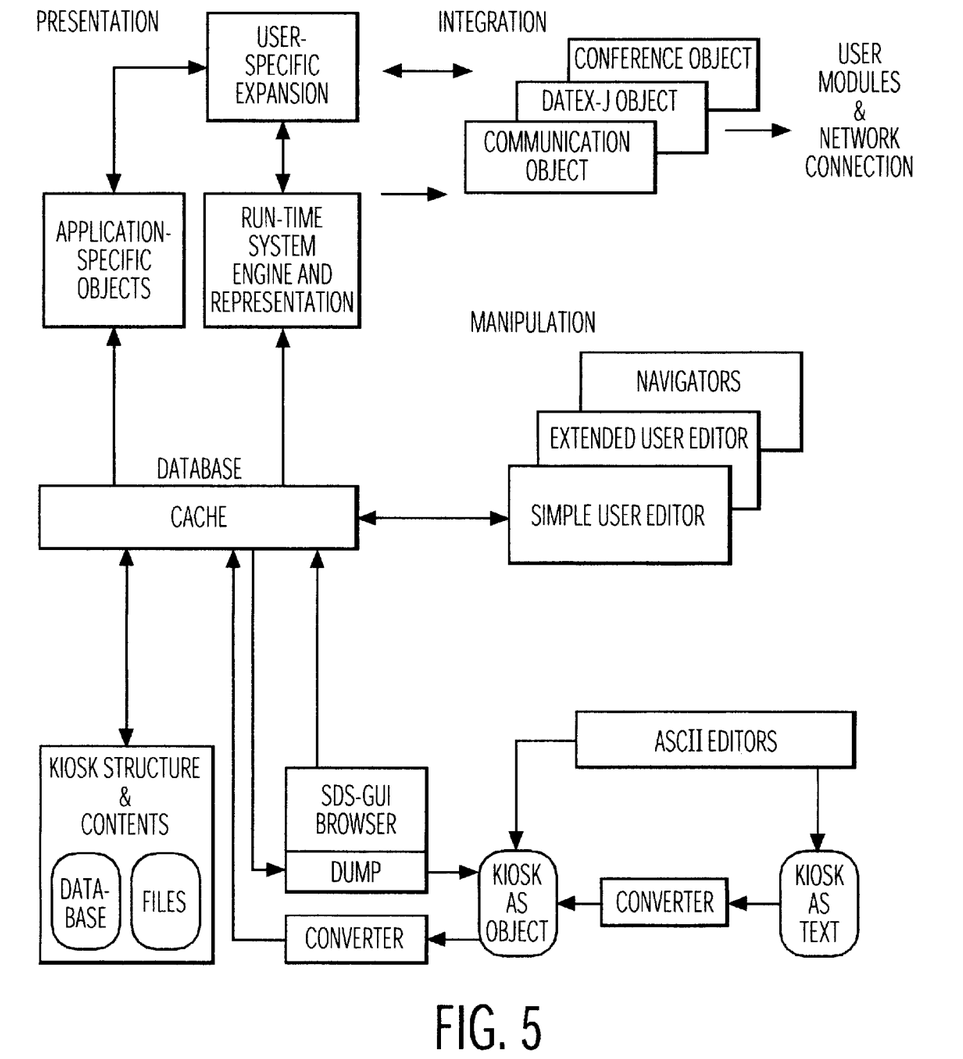
FIG. 5 a multimedia system according to the invention, in which all system functionality rests on the basis of a comprehensive object-oriented database.

Further components, not listed in FIG. 5, serve for the installation and long-distance maintenance of the system.

The present invention relates to the design and implementation of a networked multimedia kiosk system. Such a system is suitable for presenting multimedia data (text, graphics, audiovisual data, moving and still pictures) and enabling; the user to have a dialogue with an external consultant location.

Spatially separate kiosks are interrelated over a public network (e.g. ISDN). The individual terminals are as a rule used as "Point of information" (POI) or "Point of Sale" (POS).

The invention furthermore provides in a system with the following basic functionalities:

1. Four kinds of user role: administrator, editor, consultant and customer. The administrator configures and checks the overall system, the editor has the ability to change kiosk contents and/or append new data.

A customer is in the position to engage in audio/visual communication with a consultant. In this way the customer has a competent contact, whom he can consult on questions concerning kiosk contents or who can provide help on problems in navigating through certain content areas of the customer kiosk.

2. Video conferencing: The system is capable of setting up dynamically a video conference between two individual systems, and of synchronizing the relevant kiosk pages. This functionality is a requirement for making available consultants for the user role described under 1.

3. Remote Updating: The Remote-Update function updates content—as well as configuration data of individual kiosks, which were previously processed from the Administrator and/or Editor.

4. Statistics: The use of the customer terminals is recorded statistically and can be evaluated centrally at the Administration location.

Figure 6:
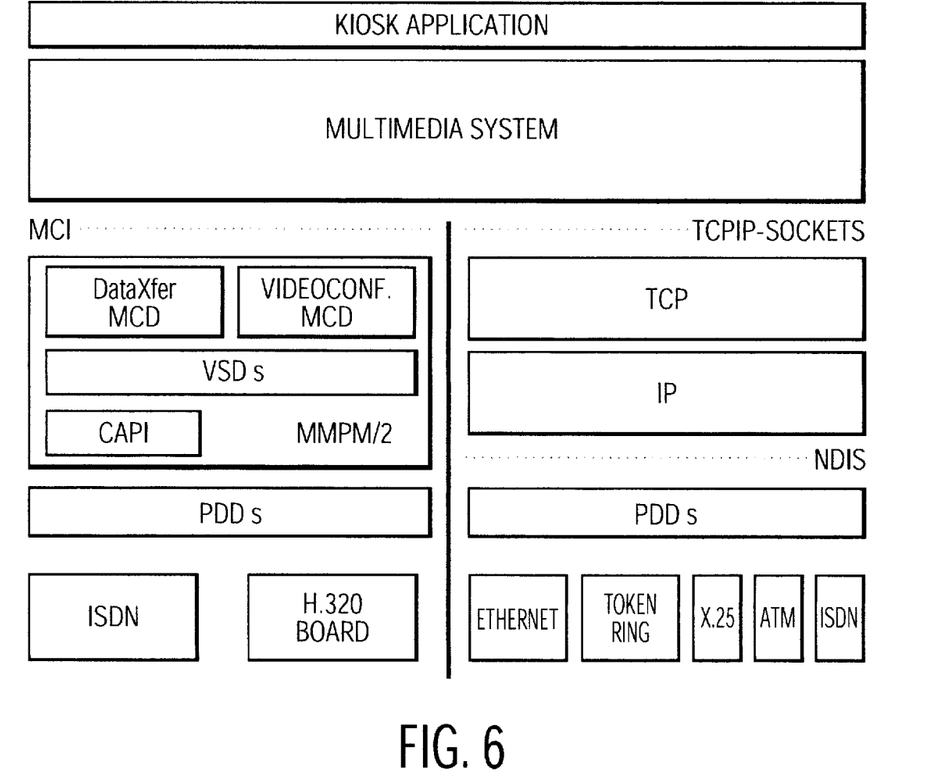
FIG. 6 as complementary to FIG. 5, a detailed description of the system components responsible for the communication.

As a complement to FIG. 5, FIG. 5 shows a detailed description of the system components responsible for the communication between the corresponding individual systems. The multimedia system has a reporting module, which registers all operations of the corresponding system unit on the object database. If a system unit in the role of the editor or administrator carries out an edit session, this module records and archives all operations, which lead to changes in the object database as a consequence. This record represents a logical editor unit. This logical editor unit is handled as a version object in the object database. Thus, the object database in the form of these version objects stores its own amendment deltas (incremental filing principle).

In this way it is possible for joined system units themselves to update or reset any desired version status, without undertaking a complete database replacement.

The following principle, applies:

Version status $n$ = Basic database (version 0) +
version object $1 + \ldots +$ Version object $n-1$ + version object $n$ The actual network load for updates is thus limited essentially to the transfer of version objects.

We claim:

1. Multimedia information system with at least two system units connected via a communication network, whereby the system units each comprise:

a user interface for interactive presentation of presentation objects to a user, said presentation objects including information contents stored in said each system unit and said user interface being determined by configuration data stored in said each system unit, and whereby said system further comprises:

an object-oriented database for storing updating information for updating the information contents and/or configuration data stored at the system units for dynamic updating of the information contents and/or configuration data stored at the system units during run-time of the system units;

editing means for creating said updating information stored in the object-oriented database; and at least one control unit for controlling the system units to access said object-oriented database and fetch said updating information during run-time of the system units.

2. System in accordance with claim 1, further characterised by a database interface for administration of database attributes and administration of database objects.

3. System in accordance with claim 1, characterised by timer means for timing the updating of the information contents and/or configuration data at the system units.

4. System in accordance with claim 1, characterised by version objects for the characterization of the relevant version of the information contents and/or configuration data.

5. System in accordance with claim 4, further characterised by a reporting module for the recording and filing of operations carried out on the object-oriented database which result in changes in the object-oriented database.

6. Method for online updating of the database contents in system units of a multimedia information system, comprising the following steps:

storing version objects defined by a current version status in an object-oriented database which is accessible to the system units, transferring said version objects between the individual system units and the object-oriented database;

recording changes in said object-oriented database relating to the version objects;

updating the contents of the object-oriented database by transferring current version objects between the object-oriented database and at least one of the system units.

7. Method in accordance with claim 6, characterised in that the current version object "n" is calculated from a version object "0" stored in a basic database and the successive addition of incremental version objects "1", "n−1", "n".

* * * * *